Figures 1, 2, 3:
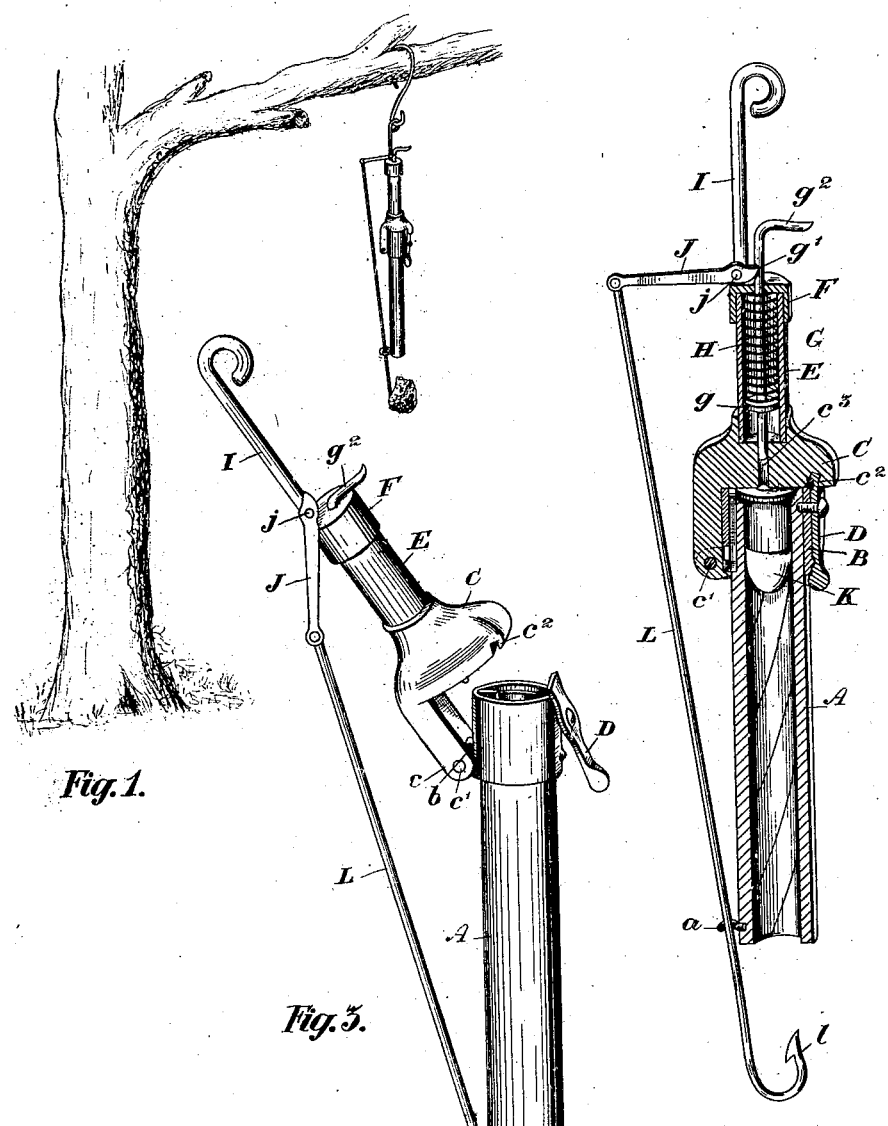

(No Model.)

J. R. BOOTH.
ANIMAL TRAP GUN.

No. 575,204. Patented Jan. 12, 1897.

Witnesses.
E. R. Case.
W. J. Withrow.

Inventor.
J. R. Booth
by Fetherstonhaugh & Co.
Attys.

UNITED STATES PATENT OFFICE.

JAMES ROGER BOOTH, OF BARRIE, CANADA.

ANIMAL-TRAP GUN.

SPECIFICATION forming part of Letters Patent No. 575,204, dated January 12, 1897.

Application filed March 9, 1896. Serial No. 582,427. (No model.)

*To all whom it may concern:*

Be it known that I, JAMES ROGER BOOTH, builder, of the town of Barrie, in the county of Simcoe, in the Province of Ontario, Canada, have invented certain new and useful Improvements in Bait-Set Guns, of which the following is a specification.

My invention relates to improvements in bait-set guns more particularly adapted for the capture of fur-bearing animals; and the object of the invention is to design a simple and cheap form of gun not liable to get out of order and by which the animals may be shot directly in the head or neck, so that the fur will not be destroyed or deteriorated; and and it consists, essentially, of a gun in which the barrel is preferably formed with a swinging breech peculiarly held in place, a tube being provided in alinement with the barrel, through which extends the firing-pin, such firing-pin being operated through a catch-lever connected to a rod from which the bait is suspended, and the gun being designed to be preferably hung from a tree in the manner hereinafter more particularly explained.

Figure 1 is a perspective view showing my bait-set gun in position. Fig. 2 is a sectional perspective view of my gun. Fig. 3 is a perspective view showing the breech opened for the insertion of a cartridge.

In the drawings like letters of reference indicate corresponding parts in each figure.

A is the barrel of the gun.

B is a sleeve which fits over the barrel at the butt-end. The sleeve B is provided with a lug $b$, as shown. Upon the lug $b$ of the sleeve is pivotally swung the breech C by the jaws $c$, through which and the lug the connecting-pin $c'$ extends. The opposite side of the breech is provided with a substantially dovetailed notch $c^2$. When the breech is closed, it is held in place by the pivoted catch D, which is swung into the notch $c^2$, the top of the catch being of corresponding shape to the notch.

E is a tube which is fitted into the reduced outer end of the breech and is provided with a suitable cap F.

G is the firing-pin, which extends through the cap F, tube E, and partially through a hole $c^3$ in the breech.

$g$ is a disk secured on the pin G, and H is a strong spiral spring extending between the disk and the cap F.

$g'$ is a notch made in the firing-pin, and $g^2$ is a hooked end.

I is a rod having an eye-shaped upper end thereon by which it may be suspended by a wire to a branch of a tree, as indicated in Fig. 1, or connected to any other support.

J is a lever which is pivoted at $j$, preferably on the rod I, and has a pointed end which normally engages with the notch $g'$ and rests against the cap F, so as to normally hold the firing-pin from the cartridge K.

L is a wire rod pivotally connected to the end of the lever J and extending down through a loop $a$, secured in the barrel A near the muzzle. The lower end of the rod L is provided with a barbed hook $l$, from which the bait is suspended.

The operation of my gun is as follows: Immediately upon the animal gripping the bait and pulling on it the lever J will be pulled down at the outer end and the inner end relieved from the notch $g'$ in the firing-pin, which will immediately be thrown down by the spring against the cartridge and discharge such cartridge, the ball of which will pass through the head or neck of the animal.

Although I show a swinging breech for convenience in placing the cartridge, it will of course be understood that the upper tube might be simply screwed into the end of the barrel; but as if made in this way the threads would likely become rusted I preferably make it in the form shown.

What I claim as my invention is—

1. A bait-set gun comprising the barrel, the breech having a depending arm pivoted to one side of the barrel, locking means for holding the breech in place over the end of the barrel, the tube fitted to the breech and having a cap at its upper end, the spring-pressed firing-pin within the tube, the rod secured to the cap and having a hooked upper end for supporting the gun in a vertical position, the lever for engaging the firing-pin, and holding it in its rearward position, and the trip connected to the lever and extending down into proximity to the muzzle of the gun, substantially as described.

2. In combination, the barrel, the sleeve upon the upper end thereof, having a projecting lug, the breech fitting the open end of the barrel and having a depending arm pivoted to said lug, the pivoted catch on the opposite side of the sleeve adapted to engage a notch in the breech, the tube carried upon the upper end of the breech, the spring-pressed firing-pin in said tube, the sustaining-rod secured to the tube for sustaining the gun in a vertical position, and the lever and trip, substantially as described.

JAMES ROGER BOOTH.

Witnesses:
F. A. LUCAS,
MURRAY C. BIGGER.